US010223091B2

(12) United States Patent
Bertolli et al.

(10) Patent No.: US 10,223,091 B2
(45) Date of Patent: *Mar. 5, 2019

(54) UNALIGNED INSTRUCTION RELOCATION

(71) Applicant: International Business Machines Corporation, Armonk, NY (US)

(72) Inventors: Carlo Bertolli, Dobbs Ferry, NY (US); John K. O'Brien, South Salem, NY (US); Olivier H. Sallenave, Baldwin Place, NY (US); Zehra N. Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/654,991

(22) Filed: Jul. 20, 2017

(65) Prior Publication Data

US 2017/0351501 A1 Dec. 7, 2017

Related U.S. Application Data

(63) Continuation of application No. 14/667,933, filed on Mar. 25, 2015, now Pat. No. 9,792,098.

(51) Int. Cl.
*G06F 9/44* (2018.01)
*G06F 8/54* (2018.01)
(Continued)

(52) U.S. Cl.
CPC ................ *G06F 8/54* (2013.01); *G06F 8/445* (2013.01); *G06F 9/3001* (2013.01); *G06F 9/3012* (2013.01)

(58) Field of Classification Search
CPC .......... G06F 8/54; G06F 8/445; G06F 9/3001; G06F 9/3012
See application file for complete search history.

(56) References Cited

U.S. PATENT DOCUMENTS 5,752,073 A * 5/1998 Gray, III ............... G06F 9/3001 712/1
5,819,058 A * 10/1998 Miller ................. G06F 9/30156 712/210
(Continued)

OTHER PUBLICATIONS

List of IBM Patents or Patent Applications Treated as Related; (Appendix P), Filed Aug. 18, 2017; 2 pages.

*Primary Examiner* — Ziaul A Chowdhury
(74) *Attorney, Agent, or Firm* — Cantor Colburn LLP; Jennifer Davis

(57) ABSTRACT

In one embodiment, a computer-implemented method includes receiving source code to be compiled into an executable file for an unaligned instruction set architecture (ISA). Aligned assembled code is generated, by a computer processor. The aligned assembled code complies with an aligned ISA and includes aligned processor code for a processor and aligned accelerator code for an accelerator. A first linking pass is performed on the aligned assembled code, including relocating a first relocation target in the aligned accelerator code that refers to a first object outside the aligned accelerator code. Unaligned assembled code is generated in accordance with the unaligned ISA and includes unaligned accelerator code for the accelerator and unaligned processor code for the processor. A second linking pass is performed on the unaligned assembled code, including relocating a second relocation target outside the unaligned accelerator code that refers to an object in the unaligned accelerator code.

9 Claims, 5 Drawing Sheets

400

GENERATE ALIGNED ASSEMBLED CODE BASED ON SOURCE CODE — 410

LINKER PERFORMS FIRST LINKING PASS ON THE ALIGNED ASSEMBLED CODE — 420

GENERATE UNALIGNED ASSEMBLED CODE — 430

LINKER PERFORMS SECOND LINKING PASS ON THE UNALIGNED ASSEMBLED CODE — 440

OUTPUT EXECUTABLE FILE BASED ON THE FIRST AND SECOND LINKING PASSES — 450

(51) Int. Cl.
*G06F 8/41* (2018.01)
*G06F 9/30* (2018.01)

(56) References Cited

U.S. PATENT DOCUMENTS

| | | | | |
|---|---|---|---|---|
| 6,170,051 | B1 * | 1/2001 | Dowling | G06F 9/3001 712/200 |
| 6,684,394 | B1 * | 1/2004 | Shann | G06F 8/54 717/162 |
| 7,577,895 | B2 * | 8/2009 | Venkataramana | H03M 13/09 714/758 |
| 8,832,671 | B1 * | 9/2014 | Patney | G06F 9/3012 712/216 |
| 8,843,880 | B2 * | 9/2014 | Carey | G06F 8/30 711/170 |
| 9,652,241 | B2 * | 5/2017 | Morfey | G06F 9/30032 |
| 2003/0140338 | A1 * | 7/2003 | Bowers | G06F 8/54 717/162 |
| 2005/0010743 | A1 * | 1/2005 | Tremblay | G06F 9/3001 712/10 |
| 2005/0050517 | A1 * | 3/2005 | Iley | G06F 9/4484 717/114 |
| 2008/0229298 | A1 * | 9/2008 | O'Brien | G06F 8/456 717/160 |
| 2014/0325495 | A1 * | 10/2014 | Ravi | G06F 8/452 717/150 |
| 2016/0283209 | A1 | 9/2016 | Bertolli | |
| 2016/0283211 | A1 | 9/2016 | Bertolli | |

* cited by examiner

400
GENERATE ALIGNED ASSEMBLED CODE BASED ON SOURCE CODE
410
LINKER PERFORMS FIRST LINKING PASS ON THE ALIGNED ASSEMBLED CODE
420
GENERATE UNALIGNED ASSEMBLED CODE
430
LINKER PERFORMS SECOND LINKING PASS ON THE UNALIGNED ASSEMBLED CODE
440
OUTPUT EXECUTABLE FILE BASED ON THE FIRST AND SECOND LINKING PASSES
450

UNALIGNED INSTRUCTION RELOCATION

DOMESTIC PRIORITY

This application is a continuation of U.S. patent application Ser. No. 14/667,933, filed Mar. 25, 2015, the disclosure of which is incorporated by reference herein in its entirety.

STATEMENT REGARDING FEDERALLY SPONSORED RESEARCH OR DEVELOPMENT

This invention was made with Government support under Contract No. B599858 awarded by Department of Energy. The Government has certain rights to this invention.

BACKGROUND

Various embodiments of this disclosure relate to instruction relocation and, more particularly, to unaligned instruction relocation.

Programmers generally write source code in abstract programming languages. The resulting source code must be converted into an executable file containing assembly language embedded as binary code, which a machine can run. This conversion includes both compiling and linking.

Compiling is the act of generating an object file for each source code file. Often, an object file is incomplete in the sense that it refers to objects defined in other source code files. A linker combines parts of object files as needed to generate a complete and self-contained executable file. Among the tasks of the linker is relocation, which is the act of adjusting relocation targets. Relocation targets in an object file are memory locations that contain addresses of objects, such as functions, variables, or other data. Those addresses need to be adjusted after the memory locations of the objects in the final assembled code are known.

Hardware accelerators often offer only a small amount of memory for storing executable instructions. In some cases, parallel execution may be required, and the instructions stored must then include parallel instructions, which have the potential to require even more space than would be otherwise needed. Thus, in practice, the instructions on such hardware accelerators are compressed to take advantage of as many available bits as possible. As a result, some operator fields are not aligned to the byte. This can be problematic when an instruction refers to a relocatable address or an offset of an object, because current linking technology requires relocation targets to be aligned to the byte.

Some conventional systems use indirect addressing when performing relocation for hardware accelerators. If a certain memory instruction needs to access a field whose address is to be relocated, the memory instruction accesses a compile-time constant offset in a relocation table, also referred to as a table of contents. The table contains the relocated address, and the table is properly aligned to fit the applicable linker requirements.

SUMMARY

In one embodiment of this disclosure, a computer-implemented method includes receiving source code to be compiled into an executable file for an unaligned instruction set architecture (ISA). The source code is for a processor and an accelerator. Aligned assembled code is generated, by a computer processor, representing the source code. The aligned assembled code complies with an aligned ISA and includes aligned processor code for the processor and aligned accelerator code for the accelerator. A first linking pass is performed on the aligned assembled code, including relocating a first relocation target in the aligned accelerator code that refers to a first object outside the aligned accelerator code. Unaligned assembled code is generated in accordance with the unaligned ISA. The unaligned assembled code represents the source code and includes unaligned accelerator code for the accelerator and unaligned processor code for the processor. A second linking pass is performed on the unaligned assembled code, including relocating a second relocation target outside the unaligned accelerator code that refers to an object in the unaligned accelerator code. The executable file for the unaligned ISA is output, based on the first and second linking passes.

In another embodiment, a system includes a memory having computer readable instructions and one or more processors for executing the computer readable instructions. The computer readable instructions include receiving source code to be compiled into an executable file for an unaligned instruction set architecture (ISA). The source code is for a processor and an accelerator. Further according to the computer readable instructions, aligned assembled code is generated representing the source code. The aligned assembled code complies with an aligned ISA and includes aligned processor code for the processor and aligned accelerator code for the accelerator. A first linking pass is performed on the aligned assembled code, including relocating a first relocation target in the aligned accelerator code that refers to a first object outside the aligned accelerator code. Unaligned assembled code is generated in accordance with the unaligned ISA. The unaligned assembled code represents the source code and includes unaligned accelerator code for the accelerator and unaligned processor code for the processor. A second linking pass is performed on the unaligned assembled code, including relocating a second relocation target outside the unaligned accelerator code that refers to an object in the unaligned accelerator code. The executable file for the unaligned ISA is output, based on the first and second linking passes.

In yet another embodiment, a computer program product for relocating unaligned instructions includes a computer readable storage medium having program instructions embodied therewith. The program instructions are executable by a processor to cause the processor to perform a method. The method includes receiving source code to be compiled into an executable file for an unaligned instruction set architecture (ISA). The source code is for a processor and an accelerator. Further according to the method, aligned assembled code is generated representing the source code. The aligned assembled code complies with an aligned ISA and includes aligned processor code for the processor and aligned accelerator code for the accelerator. A first linking pass is performed on the aligned assembled code, including relocating a first relocation target in the aligned accelerator code that refers to a first object outside the aligned accelerator code. Unaligned assembled code is generated in accordance with the unaligned ISA. The unaligned assembled code represents the source code and includes unaligned accelerator code for the accelerator and unaligned processor code for the processor. A second linking pass is performed on the unaligned assembled code, including relocating a second relocation target outside the unaligned accelerator code that refers to an object in the unaligned accelerator code. The executable file for the unaligned ISA is output, based on the first and second linking passes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are relocation systems, methods, and computer program products enabling relocation for unaligned instruction set architectures (ISAs) without the use of indirect addressing. With the conventional solution of indirect addressing, for every required access to an object whose address has to be relocated, a double memory access occurs when the relocation target is not aligned as required by the linker. In other words, the relocation table is accessed, and then the object address itself is accessed. Embodiments of the present relocation system may provide a more efficient relocation mechanism that avoids the double memory accesses that result from indirect addressing.

To this end, the relocation system may define an aligned ISA that is based on, and is a modified version of, a current unaligned ISA, such as the unaligned ISA of a hardware accelerator. The difference between the aligned ISA and the unaligned ISA on which it is based may be that the instructions, including relocation targets, are byte-aligned. The aligned ISA may be semantically equivalent to the unaligned ISA, but may satisfy the alignment constraints imposed by a linker. For example, and not by way of limitation, assembled code for the aligned ISA (i.e., aligned assembled code) may be the same as assembled code for the unaligned ISA (i.e., unaligned assembled code) except that padding may be used to shift the instructions of the unaligned assembled code such that each instruction is byte-aligned in the aligned assembled code. Linking may thus be applied to a version of the program expressed with an aligned ISA that satisfies the linker's alignment constraints. However, after linking occurs, the hardware accelerator may be passed unaligned assembled code, which will generally be more compressed.

Figure 1:
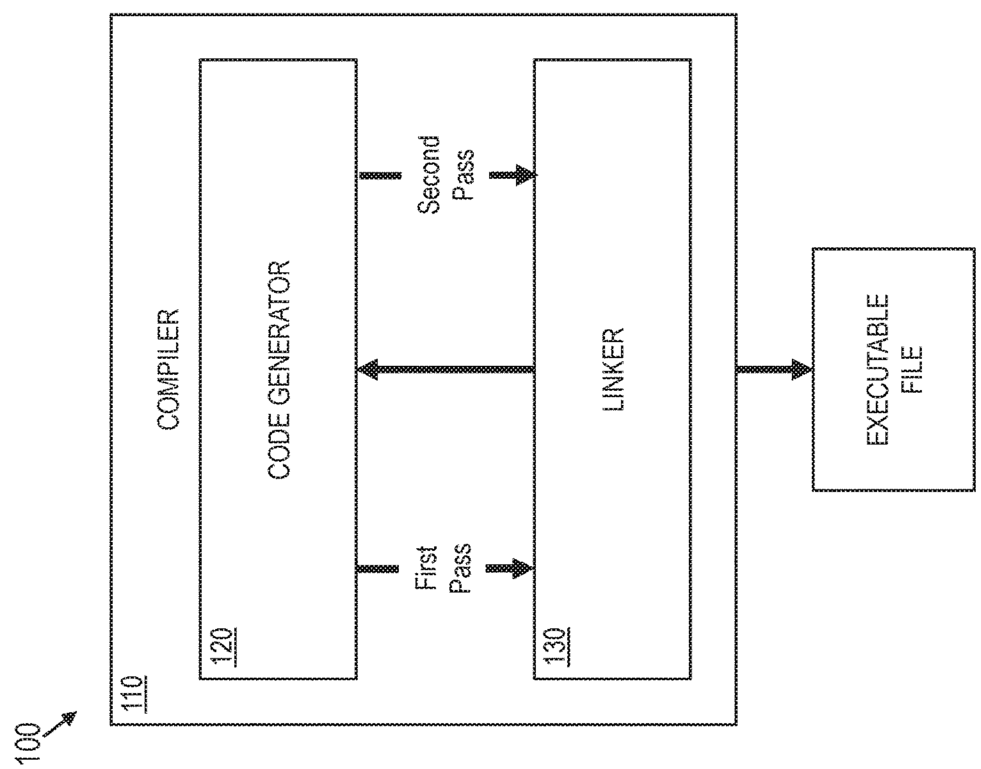
FIG. 1 is a block diagram of a relocation system, according to some embodiments of this disclosure.

FIG. 1 is a block diagram of a relocation system 100, according to some embodiments of this disclosure. As shown in FIG. 1, in the relocation system 100, a compiler 110 may include a code generator 120 and a linker 130, both of which may be implemented in software, hardware, or a combination of software and hardware. The linker 130 may be integrated into the compiler 110 and may link objects referenced in assembled code generated by the code generator 120, thus enabling programs to include objects defined in other source code files. According to some embodiments, these linked objects may include, for example, functions, variables, and other data. Because the linker 130 may be part of an existing operating system, it may burdensome to change the linker 130. Thus, according to some embodiments, the linker 130 may be a conventional linker found in the existing art. The relocation system 100 may be configured to compile one or more source code files, outputting an executable file for an unaligned ISA, such as that used by a hardware accelerator.

From source code files, the code generator 120 of the compiler 110 may be capable of generating both aligned assembled code, for the aligned ISA, and unaligned assembled, for the unaligned ISA. Generally, according to some embodiments, the linker 130 may perform two linking passes, including a first pass using the aligned assembled code and a second pass using the unaligned assembled code. In some embodiments, the compiler 110 may therefore call the linker 130 on two occasions, with each occasion resulting in a linking pass. More specifically, in some embodiments, the compiler 110 may generate the aligned assembled code, by way of the code generator 120; call the linker to relocate relocation targets of the aligned assembled code in the first linking pass; convert the aligned assembled code to unaligned assembled code, or generate the unaligned assembled code from the original source code, by way of the code generator 120; call the linker 130 to relocate relocation targets of the unaligned assembled code in the second linking pass; and then output a resulting executable file.

From the original source code, the compiler 110 may generate assembled code according to the aligned ISA, where the aligned ISA is semantically equivalent to the native unaligned ISA for which an executable is sought. In some embodiments, the compiler 110 may be configured to directly generate aligned assembled code from the source code. In other embodiments, however, the compiler 110 may generate unaligned assembled code and then translate it to the equivalent aligned assembled code in the aligned ISA. Translating the assembled code from the unaligned ISA to the aligned ISA may be performed in various ways. For example, and not by way of limitation, this translation may be performed by adding padding to the unaligned assembled code. The padding may be, for example, blank bits (e.g., zeroes) added at the end of each instruction, as needed, to move the following instruction to a byte-aligned position. Thus, in some embodiments, the compiler 110 may be configured to generate aligned assembled code by generating the unaligned code, as usual, and then converting the unaligned code to aligned assembled code. In some other embodiments, however, the compiler 110 may be configured to generate aligned assembled code without having the intermediate action of generating unaligned assembled code. It will be understood that various compilers 120 known in the art may be used in the relocation system 100. After the aligned assembled code is generated, the compiler 110 may pass the aligned assembled code to the linker 130 for the first linking pass.

Figure 2A:
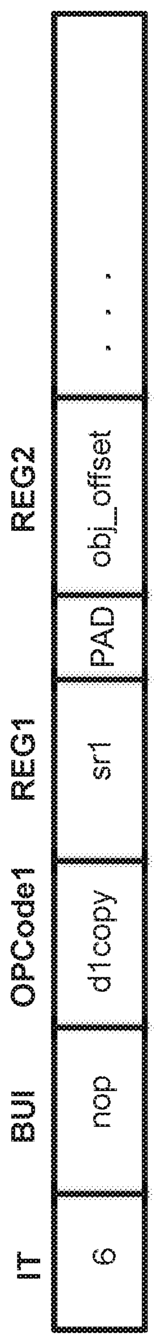
FIG. 2A illustrates an example instruction for an aligned instruction set architecture (ISA), according to some embodiments of this disclosure.
Figure 2B:
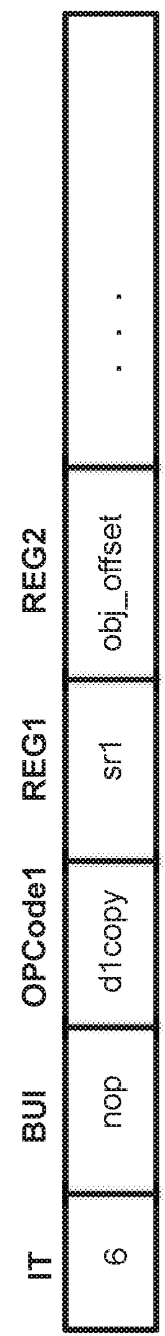
FIG. 2B illustrates an example instruction for an unaligned ISA, according to some embodiments of this disclosure.

FIG. 2A illustrates an example instruction of aligned assembled code for an aligned ISA, while FIG. 2B illustrates an equivalent instruction of unaligned assembled code for a semantically equivalent unaligned ISA, according to some embodiments of this disclosure. As shown in FIGS. 2A-2B, an instruction may contain an iteration field (IT) specifying the number of times the instruction has to be executed; a branch unit instruction (BUI), which is an empty operation (nop) in the example of FIGS. 2A-2B; an operation code for a first instruction (OPCode1), which corresponds to a full register to register copy (d1copy) in this example; a field containing the address of the first register as a target of the copy (REG1), which corresponds to the address of scalar register 1 (sr1) of the register file in this example; a field containing the address of the second register as a source of the copy (REG2) or a scalar immediate value. In this example, after linking occurs, the field REG2 contains a relocation target, which is the offset of an object in memory that is defined as part of a different object file and thus subject to relocation (obj_offset). In some embodiments, further sub-instructions may be part of the instruction described in FIGS. 2A-2B. As shown, the two instructions are the same except that the instruction of the aligned assembled code includes padding (PAD) to shift the relocation target into a byte-aligned position.

Assembled code may be in the form of object files, which are generally not executable until being linked by the linker 130. Each object file may have various sections, including an instruction section, also referred to as a text section. For an architecture that includes both a processor and an accelerator, an object file may include one or more text sections for the processor as well as one or more text sections for the accelerator. In some cases, a text section for the processor or the accelerator may include an address (i.e., a relocation target) referring to an object in a different file. There may be three categories of relocation targets that may require relocation: (1) a first category of relocation targets (i.e., relocation targets) in accelerator text sections that refer to objects outside accelerator text sections; (2) a second category of relocation targets (i.e., relocation targets) outside accelerator text sections that refer to objects contained in accelerator text sections; and (3) a third category of relocation targets that are not in accelerator text sections and refer to objects outside the accelerator text sections. In some embodiments, the first category may be relocated in the first linking pass, using aligned assembled code; the second category may be relocated in the second linking pass, using unaligned assembled code; and the third category may be relocated during either the first or the second linking pass.

The above first category of relocation targets for relocation may be relocated in the first pass because that pass may use the aligned assembled code. In other words, the first linking pass may include relocating relocation targets in aligned accelerator code (i.e., accelerator text sections of the aligned assembled code) that refer to objects outside the aligned accelerator code. As discussed above, the linker 130 may require that relocation targets be aligned to the byte. In the first linking pass, these relocation targets may be aligned to the byte, according to the aligned ISA, and may thus be relocated according to the linker's standard operation.

During the first linking pass, the linker 130 may perform relocations of relocation targets in the above first category. In some embodiments, the linking performed may be conducted in accordance with the linker's conventional operation, thus requiring no modification of the linker 130 when used with some embodiments of the present relocation system 100. In this first linking pass, the linker 130 may also perform relocations on some or all relocation targets in the third category described above (i.e., relocation targets that are not in accelerator text sections and refer to objects outside the accelerator text sections). As discussed above, relocation targets in this third category may be relocated in either linking pass.

Before the second linking pass, the compiler 110 may generate the unaligned assembled code based on the original source code. In some embodiments, this may include converting the aligned assembled code to the equivalent unaligned assembled code. As discussed above, the unaligned assembled code is the aligned assembled code without the padding that shifts instructions into byte-aligned positions. Therefore, to perform the conversion, the compiler 110 may remove this padding, thus resulting in the unaligned assembled code.

The above second category of relocation targets for relocations may be relocated during the second linking pass, which may use the unaligned assembled code using the unaligned ISA native to the hardware accelerator. In other words, the second linking pass may include relocating relocation targets outside the unaligned accelerator code (i.e., accelerator text sections of the unaligned assembled code) that refer to objects inside the unaligned accelerator code. These relocation targets may be required to be linked in the unaligned ISA because the addresses referred to in the relocation targets may be based on the position of the instructions when that assembled code is natively unaligned. The padding added to the assembled code in the aligned ISA may shift the positions of instructions, thus resulting in objects in the unaligned ISA not being where they are expected to be. Thus, relocating these relocation targets in the aligned ISA may be ineffective.

During the second linking pass, the linker 130 may perform relocations of relocation targets in the above second category. In some embodiments, the linking performed may be conducted in accordance with the linker's conventional operation, thus requiring no modification of the linker 130 when used with some embodiments of the present relocation system 100. In this second linking pass, the linker 130 may also perform relocations on some or all relocation targets in the third category described above (i.e., relocation targets that are not in accelerator text sections and refer to objects outside the accelerator text sections). As discussed above, relocation targets in this third category may be relocated in either linking pass.

It will be understood by those skilled in the art that the first linking pass and the second linking pass may be performed in reverse order, with linking first being performed on the unaligned assembled code. It will also be understood that, in some embodiments, the compiler 110 may generate both the aligned assembled code and the unaligned assembled code, and may pass both versions of the assembled code to the linker 130. In that case, although the linker 130 may still perform in two passes, no conversion or generation of additional assembled code need be performed between the two linking passes, because both versions of the assembled code will have been generated before the linking passes. It will be further understood that other variations of the relocation system 100 may also be possible.

When relocations have been performed through the two linking passes, for all three categories of relocation targets, the compiler 110 may output an executable file resulting from the linking passes. This executable file may be in the unaligned ISA and may be the final result of compiling the original source code.

Figure 3:
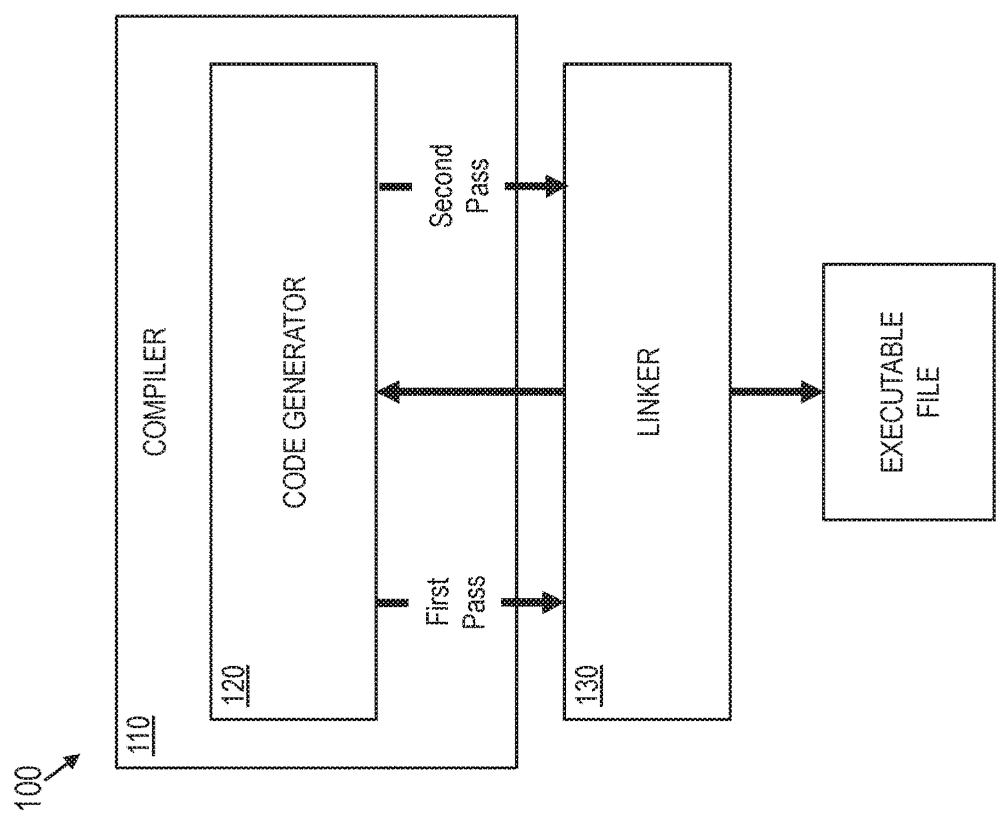
FIG. 3 is a second block diagram of the relocation system, according to some embodiments of this disclosure.

FIG. 3 is another block diagram of the relocation system 100, according to some other embodiments. In the embodiments of FIG. 1, the linker 130 is integrated into the compiler 110, but as shown in FIG. 3, this need not be the case. Rather, in some other embodiments according to FIG. 3, the linker 130 may be distinct from the compiler 110. In this case, the compiler 110 may generate the aligned assembled code and pass it to the distinct linker 130 for the relocations in the aligned ISA, and the compiler may generate the unaligned assembled code and pass it to the distinct linker for the relocations in the unaligned ISA. Because the linker 130 is distinct from the compiler 110 in this embodiment, the linker 130 need not be located on the same device as the compiler 110. Rather, in some further embodiments, the compiler 110 may be remote from the linker 130. For instance, a web service may be used to compile or link received source code.

Figure 4:
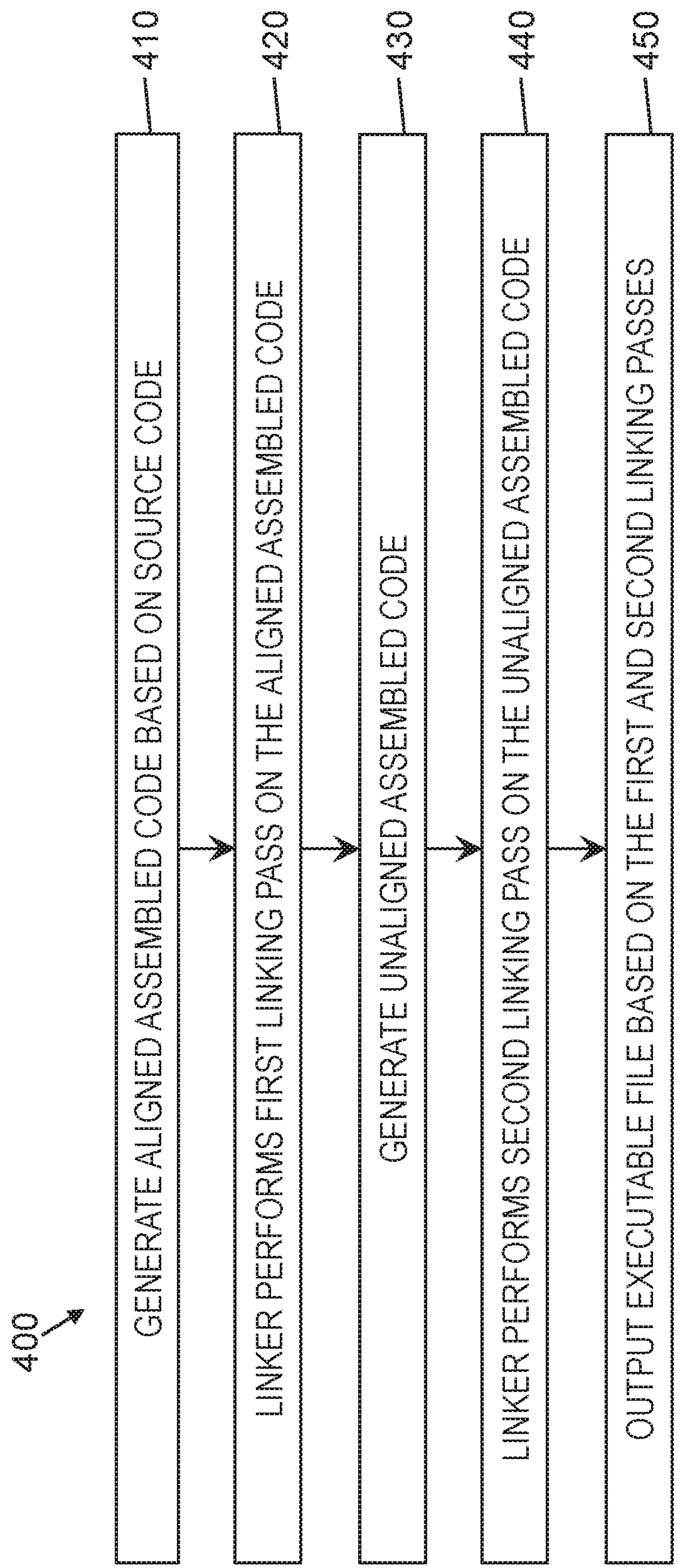
FIG. 4 is a flow diagram of a method for compiling source code for a hardware accelerator, according to some embodiments of this disclosure.

FIG. 4 is a flow diagram of a method 400 for compiling source code for a hardware accelerator, according to some embodiments of this disclosure. As shown, at block 410, the compiler 110 may generate aligned assembled code from one or more source code files. At block 420, a linker 130 may perform a first linking pass on the aligned assembled code. During this first linking pass, the linker 130 may relocate relocation targets in accelerator text sections of the aligned assembled code, which may be contained in one or more object files. At block 430, the compiler 110 may generate unaligned assembled code, which may represent the original source code. In some embodiments, generating the unaligned assembled code may be performed by transforming the aligned assembled code to equivalent unaligned assembled code by removing padding used to byte-align the instructions in the aligned assembled code. At block 440, the linker 130 may perform a second linking pass on the unaligned assembled code, which may be contained in one or more other object files. During this second linking pass, the linker 130 may relocate relocation targets outside of the accelerator text sections of the unaligned assembled code. In either linking pass, the linker 130 may also perform relocations relocation targets that are not in accelerator text sections and do not refer to objects in accelerator text sections. At block 450, the compiler may output an executable file.

Figure 5:
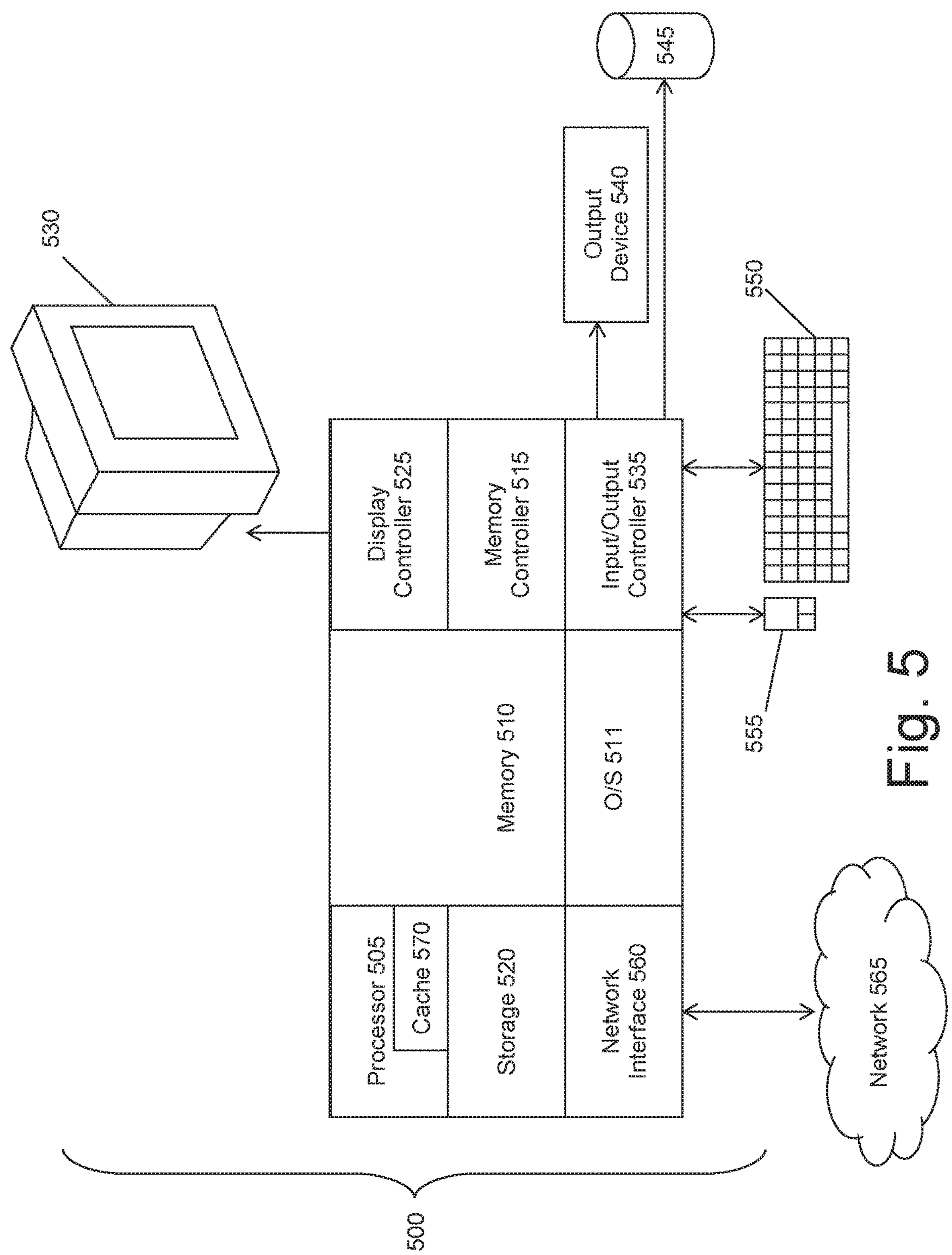
FIG. 5 is a block diagram of a computing device for implementing some or all aspects of the relocation system, according to some embodiments of this disclosure.

FIG. 5 illustrates a block diagram of a computer system 500 for use in implementing a relocation system or method according to some embodiments. The relocation systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the relocation systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Relocation systems and methods according to this disclosure may be embodied, in whole or in part, in computer program products or in computer systems 500, such as that illustrated in FIG. 5.

Technical effects and benefits of some embodiments include the ability to use an aligned ISA during a linking pass when compiling and linking source code meant for an unaligned ISA. As a result, according to some embodiments, linking can be performed efficiently with a conventional linker even though relocation targets may not be aligned to the byte in the unaligned ISA.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving source code to be compiled into an executable file for an unaligned instruction set architecture (ISA), the source code configured for a processor and an accelerator;

generating, by a computer processor, aligned assembled code representing the source code, the aligned assembled code being byte-aligned and in accordance with an aligned ISA and comprising aligned processor code for the processor and aligned accelerator code for the accelerator;

performing a first linking pass on the aligned assembled code, the first linking pass comprising relocating a first relocation target residing in the aligned accelerator code, wherein the first relocation target is a memory space maintaining an address of a first object outside the aligned accelerator code;

generating unaligned assembled code semantically equivalent to the aligned assembled code, in accordance with the unaligned ISA, the unaligned assembled code representing the source code and comprising unaligned processor code for the processor and unaligned accelerator code for the accelerator;

wherein at least a portion of the unaligned assembled code semantically equivalent to the aligned assembled code is not byte-aligned, and wherein the aligned assembled code comprises padding to achieve byte-alignment, and wherein generating the unaligned assembled code semantically equivalent to the aligned assembled code comprises:

removing padding from the aligned assembled code configured to shift instructions in the aligned assembled code to byte-aligned positions;

performing a second linking pass on the unaligned assembled code semantically equivalent to the aligned assembled code, the second linking pass comprising relocating a second relocation target residing outside the unaligned accelerator code, wherein the second relocation target is a memory space maintaining an address of a second object in the unaligned accelerator code; and outputting the executable file for the unaligned ISA based on the first linking pass and the second linking pass.

2. The method of claim 1, wherein the first linking pass further comprises relocating a third relocation target outside the aligned accelerator code that refers to a third object outside the aligned accelerator code.

3. The method of claim 1, wherein the second linking pass further comprises relocating a third relocation target outside the unaligned accelerator code that refers to a third object outside the unaligned accelerator code.

4. A system comprising:

a memory having computer readable instructions; and one or more processors for executing the computer readable instructions, the computer readable instructions comprising:

receiving source code to be compiled into an executable file for an unaligned instruction set architecture (ISA), the source code configured for a processor and an accelerator;

generating aligned assembled code representing the source code, the aligned assembled code being byte-aligned and in accordance with an aligned ISA and comprising aligned processor code for the processor and aligned accelerator code for the accelerator;

performing a first linking pass on the aligned assembled code, the first linking pass comprising relocating a first relocation target residing in the aligned accelerator code, wherein the first relocation target is a memory space maintaining an address of a first object outside the aligned accelerator code;

generating unaligned assembled code semantically equivalent to the aligned assembled code, in accordance with the unaligned ISA, the unaligned assembled code representing the source code and comprising unaligned processor code for the processor and unaligned accelerator code for the accelerator;

wherein at least a portion of the unaligned assembled code semantically equivalent to the aligned assembled code is not byte-aligned, and wherein the aligned assembled code comprises padding to achieve byte-alignment, and wherein generating the unaligned assembled code semantically equivalent to the aligned assembled code comprises:

removing padding from the aligned assembled code configured to shift instructions in the aligned assembled code to byte-aligned positions;

performing a second linking pass on the unaligned assembled code semantically equivalent to the aligned assembled code, the second linking pass comprising relocating a second relocation target residing outside the unaligned accelerator code, wherein the second relocation target is a memory space maintaining an address of a second object in the unaligned accelerator code; and outputting the executable file for the unaligned ISA based on the first linking pass and the second linking pass.

5. The system of claim 4, wherein the first linking pass further comprises relocating a third relocation target outside the aligned accelerator code that refers to a third object outside the aligned accelerator code.

6. The system of claim 4, wherein the second linking pass further comprises relocating a third relocation target outside the unaligned accelerator code that refers to a third object outside the unaligned accelerator code.

7. A computer program product for relocating unaligned instructions, the computer program product comprising a computer readable storage medium having program instructions embodied therewith, the program instructions executable by a processor to cause the processor to perform a method comprising:

receiving source code to be compiled into an executable file for an unaligned instruction set architecture (ISA), the source code configured for a processor and an accelerator;

generating aligned assembled code representing the source code, the aligned assembled code being byte-aligned and in accordance with an aligned ISA and comprising aligned processor code for the processor and aligned accelerator code for the accelerator;

performing a first linking pass on the aligned assembled code, the first linking pass comprising relocating a first relocation target residing in the aligned accelerator code, wherein the first relocation target is a memory space maintaining an address of a first object outside the aligned accelerator code;

generating unaligned assembled code semantically equivalent to the aligned assembled code, in accordance with the unaligned ISA, the unaligned assembled code representing the source code and comprising unaligned processor code for the processor and unaligned accelerator code for the accelerator;

wherein at least a portion of the unaligned assembled code semantically equivalent to the aligned assembled code is not byte-aligned, and wherein the aligned assembled code comprises padding to achieve byte-alignment, and wherein generating the unaligned assembled code semantically equivalent to the aligned assembled code comprises:

removing padding from the aligned assembled code configured to shift instructions in the aligned assembled code to byte-aligned positions;

performing a second linking pass on the unaligned assembled code semantically equivalent to the aligned assembled code, the second linking pass comprising relocating a second relocation target residing outside the unaligned accelerator code, wherein the second relocation target is a memory space maintaining an address of a second object in the unaligned accelerator code; and outputting the executable file for the unaligned ISA based on the first linking pass and the second linking pass.

8. The computer program product of claim 7, wherein the first linking pass further comprises relocating a third relocation target outside the aligned accelerator code that refers to no objects inside the aligned accelerator code.

9. The computer program product of claim 7, wherein the second linking pass further comprises relocating a third relocation target outside the unaligned accelerator code that refers to a third object outside the unaligned accelerator code.

* * * * *